United States Patent
Vasamsetti et al.

(10) Patent No.: US 11,843,545 B1
(45) Date of Patent: Dec. 12, 2023

(54) METHOD AND SYSTEM FOR CONTAINERIZED NETWORK FUNCTION MANAGEMENT SERVICE

(71) Applicant: Verizon Patent and Licensing Inc., Basking Ridge, NJ (US)

(72) Inventors: Satish S. Vasamsetti, San Francisco, CA (US); Parry Cornell Booker, Sunnyvale, TX (US); Jerry Steben, Fort Worth, TX (US); Emerando M. Delos Reyes, Pleasant Hill, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/819,761

(22) Filed: Aug. 15, 2022

(51) Int. Cl.
*H04L 47/765* (2022.01)

(52) U.S. Cl.
CPC .................................. *H04L 47/765* (2013.01)

(58) Field of Classification Search
CPC .............................. H04L 47/765; H04L 47/76
See application file for complete search history.

(56) References Cited

U.S. PATENT DOCUMENTS

| | | | | |
|---|---|---|---|---|
| 7,689,243 B2 * | 3/2010 | Kaneda | .................. | H04M 3/493 455/418 |
| 2019/0215332 A1 * | 7/2019 | Kaplan | .................... | H04L 45/00 |
| 2021/0011816 A1 * | 1/2021 | Mitkar | ................. | G06F 11/1484 |

FOREIGN PATENT DOCUMENTS

WO     WO-2021205204 A1 * 10/2021 ......... G06F 9/45558

OTHER PUBLICATIONS

Adaptive scaling of Kubernetes pods by David Balla, Csaba Simon, Markosz Maliosz (Year: 2020).*

* cited by examiner

*Primary Examiner* — S M A Rahman

(57) ABSTRACT

A method, a device, and a non-transitory storage medium are described in which a containerized network function (CNF) management service is provided. The service may provide for allocating discrete sets of CNF resources deployed as pods to provide application services to end devices; identifying at least one threshold resource value associated with a first number of the deployed pods which are activated to provide the application services; determining an anticipated nonsatisfaction of the at least one threshold resource value associated with the first number of the deployed pods; and invoking, for a period of time, horizontal pod autoscaling (HPA) via an application programming interface to activate a second number of the deployed pods to provide the application services, wherein the HPA is performed non-incrementally until at least one of the period of time has elapsed or each of the deployed pods has been activated to provide the application services.

20 Claims, 5 Drawing Sheets

METHOD AND SYSTEM FOR CONTAINERIZED NETWORK FUNCTION MANAGEMENT SERVICE

BACKGROUND

To satisfy the projected needs and demands of users of mobile communication devices, wireless communication providers continue to improve and expand available application services as well as networks used to deliver such services. One such improvement involves the virtualization of the components in wireless networks utilizing configurable cloud-based wide area network (WAN) resources. The virtualized components may include containerized network functions (CNFs) for performing a variety of communication tasks. However, dynamically instantiating the CNFs— using a container orchestration platform that organizes the containers into logical units ("pods")—to service a multitude of different application services and/or handle myriad network conditions, poses various technological challenges.

DETAILED DESCRIPTION

Figure 1:
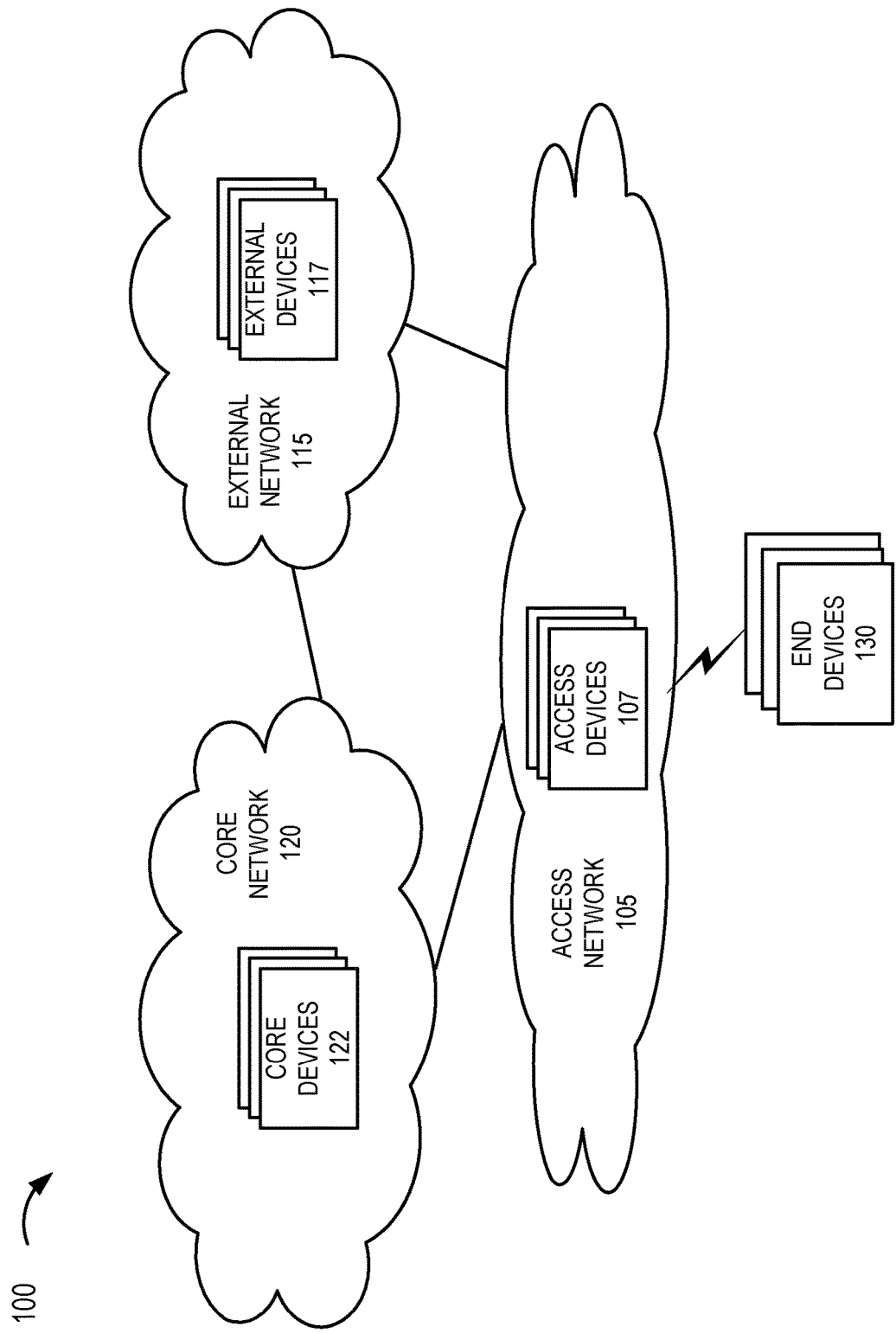
FIG. 1 is a diagram illustrating an exemplary environment in which an exemplary embodiment of a CNF management service may be implemented.

The following detailed description refers to the accompanying drawings. The same reference numbers in different drawings may identify the same or similar elements. Also, the following detailed description does not limit the invention.

Multi-access edge computing (MEC) (also known as mobile edge computing (MEC)) networks, cloud networks, or other types of end device application or service layer networks (referred to herein as "application service layer network") will—at times—have insufficient resources (e.g., physical, logical, virtual) configured to accommodate end device traffic (e.g., planned/unplanned traffic spikes, etc.). For example, the application service layer network may be incapable of supporting a spike in the connection requests from end devices/users, the number of applications running concurrently, the amount of content data involved in executing the applications (e.g., 3 D extreme reality, etc.), or a transient in the state of the network (e.g., undergoing deployment, reconfiguration, and/or upgrading; connectivity failures; congestion; etc.), and/or the state of neighboring networks (e.g., affecting handovers, etc.). Users of the application service layer network thus may periodically experience a degraded level of quality of service (QoS) associated with an application and/or a service (referred to as an "application service").

Techniques exist to dynamically scale in/out and scale up/down resource allocation to application services executing in an application service layer network. The scaling of resources for an application service includes vertical autoscaling (e.g., modifying an amount of a resource allocated to a server device, etc.) and/or horizontal scaling (e.g., adding or removing containerized NF resources in the form of pods, etc.). Auto-scaling mechanisms such as horizontal pod autoscaling (HPA) incrementally adjust the number of worker nodes to support the application service based on auto-scaling rules that define various threshold values for triggering of the HPA. For example, the threshold values may pertain to central processing unit (CPU) and/or memory utilization/capacity, application service key performance indicators (KPIs), etc., associated with application service layer resources. However, current HPA infrastructures are typically incapable of scaling up the quantity of available resources in a relatively short time interval, for example, in response to a planned/unplanned spike in resource usage.

According to exemplary embodiments, a CNF management service pertaining to a lifecycle of NFs is described. According to an exemplary embodiment, the CNF management service may include an application programming interface (API) of a containerized orchestration platform (COP). The API may be invoked by an application service experiencing a planned/unplanned traffic spike. According to an exemplary embodiment, the COP API may be invoked via a representational state transfer API (RestAPI), a graphical user interface (GUI) API, and the like, in a manner that enables an application service to maintain an expected service quality even during transient network and/or application-based events. According to an exemplary embodiment, the API connects to a COP infrastructure as an external network traffic monitoring tool, and to a cluster auto-scaler, to automatically add additional worker nodes. In this manner, the CNF management service dynamically manages varying levels of user demand (e.g., peak-time levels of traffic, etc.), one or multiple KPIs, and/or performance metrics (e.g., latency, throughput, error rate, or another type of performance metric).

In view of the foregoing, the CNF management service enables an application service to be resilient and stable, and prevents and/or minimizes service quality degradation and/or disruption while responding to planned/unplanned traffic spikes and/or transient network events without unbounded network resource usage. The CNF management service optimizes network resource allocation and/or usage in view of the dynamic nature of user demand, network state, local RF conditions, and/or another type of condition that may cause a substantial increase in network resource usage.

FIG. 1 is a diagram illustrating an exemplary environment 100, such as a cloud-native environment, in which an exemplary embodiment of CNF management service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., Software Defined Networking (SDN), virtual, logical, network slice, etc.). The number, the type, and the arrangement of network devices, and the number of end devices 130 are exemplary. For purposes of description, end device 130 is not considered a network device.

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. According to various exemplary implementations, the interface of the network device may be a service-based interface, a reference point-based interface, an Open Radio Access Network (O-RAN) interface, a 5 G interface, another generation of interface (e.g., 5.5 G, 6 G, 7 G, etc.), or some other type of interface.

Access network 105 may include one or multiple networks of one or multiple types and technologies. For example, access network 105 may be implemented to include a 5 G RAN, a future generation RAN (e.g., a sixth generation (6 G) RAN, a seventh generation (7 G) RAN, or a subsequent generation RAN), a centralized-RAN (C-RAN), and/or another type of access network. Access network 105 may include a legacy RAN (e.g., a third generation (3 G) RAN, a 4 G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120.

Depending on the implementation, access network 105 may include one or multiple types of network devices, such as access devices 107. For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a centralized unit (CU), a CU control plane (CU CP), a CU user plane (CU UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), 0-RAN next generation Node B (O-gNB), O-RAN evolved Node B (O-eNB)), a 5 G ultra-wide band (UWB) node, a future generation wireless access device (e.g., a 6 G wireless station, a 7 G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access.

External network 115 may include one or multiple networks of one or multiple types and technologies that provides an application service. For example, external network 115 may be implemented using one or multiple technologies including, for instance, network function virtualization (NFV), software defined networking (SDN), cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a MEC network, a fog network, the Internet, a packet data network (PDN), a service provider network, the World Wide Web (WWW), an Internet Protocol Multimedia Subsystem (IMS) network, a Rich Communication Service (RCS) network, an SDN, a virtual network, a packet-switched network, a data center, or other type of network that may provide access to and may host an end device application service.

Depending on the implementation, external network 115 may include various network devices such as external devices 117. For example, external devices 117 may include virtual network devices (e.g., virtualized network functions (VNFs), servers, host devices, containers, hypervisors, virtual machines (VMs), network function virtualization infrastructure (NFVI), and/or other types of virtualization elements, layers, hardware resources, operating systems, engines, etc.) that may be associated with application services for use by end devices 130. By way of further example, external devices 117 may include mass storage devices, data center devices, NFV devices, SDN devices, cloud computing devices, platforms, and other types of network devices.

External devices 117 may also include other types of network devices that support the operation of external network 117 and the provisioning of application services, such as an orchestrator (e.g., a network function virtualization orchestrator (NFVO), a mobile edge (ME) orchestrator, etc.), an edge manager (e.g., a virtualized infrastructure manager (VIM), a virtual network function manager (VNFM), an ME platform manager), an operations support system (OSS), a local domain name system (DNS), registries, and/or other types of network devices (e.g., routers, core devices 122 (e.g., a user plane function (UPF), etc.), an ingress device, a load balancer, etc.), and/or other types of architectures and/or external devices 117 that may pertain to various network-related functions (e.g., security, management, charging, billing, authentication, authorization, policy enforcement, development, etc.). External devices 117 may include non-virtual, logical, and/or physical network devices.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services.

According to an exemplary embodiment, at least a portion of external devices 117 may include CNF management service logic and an interface (e.g., an API) that supports the CNF management service, as described herein.

Core network 120 may include one or multiple networks of one or multiple network types and technologies. Core network 120 may include a complementary network of access network 105. For example, core network 120 may be implemented to include a 5 G core network, an EPC of an LTE network, an LTE-Advanced (LTE-A) network, and/or an LTE-A Pro network, a future generation core network (e.g., a 5.5 G, a 6 G, a 7 G, or another generation of core network), and/or another type of core network.

Depending on the implementation, core network 120 may include various types of network devices that are illustrated in FIG. 1 as core devices 122. For example, core devices 122 may include a user plane function (UPF), a Non-3 GPP Interworking Function (N3IWF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a MME, a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

End devices 130 include a device that has computational and/or communication capabilities (e.g., wireless, wired, optical, etc.). End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130. End devices 130 may include "edge-aware" and/or "edge-unaware" application service clients.

End device 130 may support one or multiple RATs (e.g., 4 G, 5 G, and/or future generation RAT) and various portions of the radio spectrum (e.g., multiple frequency bands, multiple carrier frequencies, licensed, unlicensed, mmWave, above mmWave, cmWave, etc.), various levels and genres of network slicing, DC service, CA service, and/or other types of connectivity services. Additionally, end device 130 may include one or multiple communication interfaces that provide one or multiple (e.g., simultaneous, interleaved, etc.) connections via the same or different RATs, frequency bands, carrier frequencies, network slices, and/or via another communication medium (e.g., wired, etc.). The multimode capabilities of end device 130 may vary among end devices 130.

Figure 2:
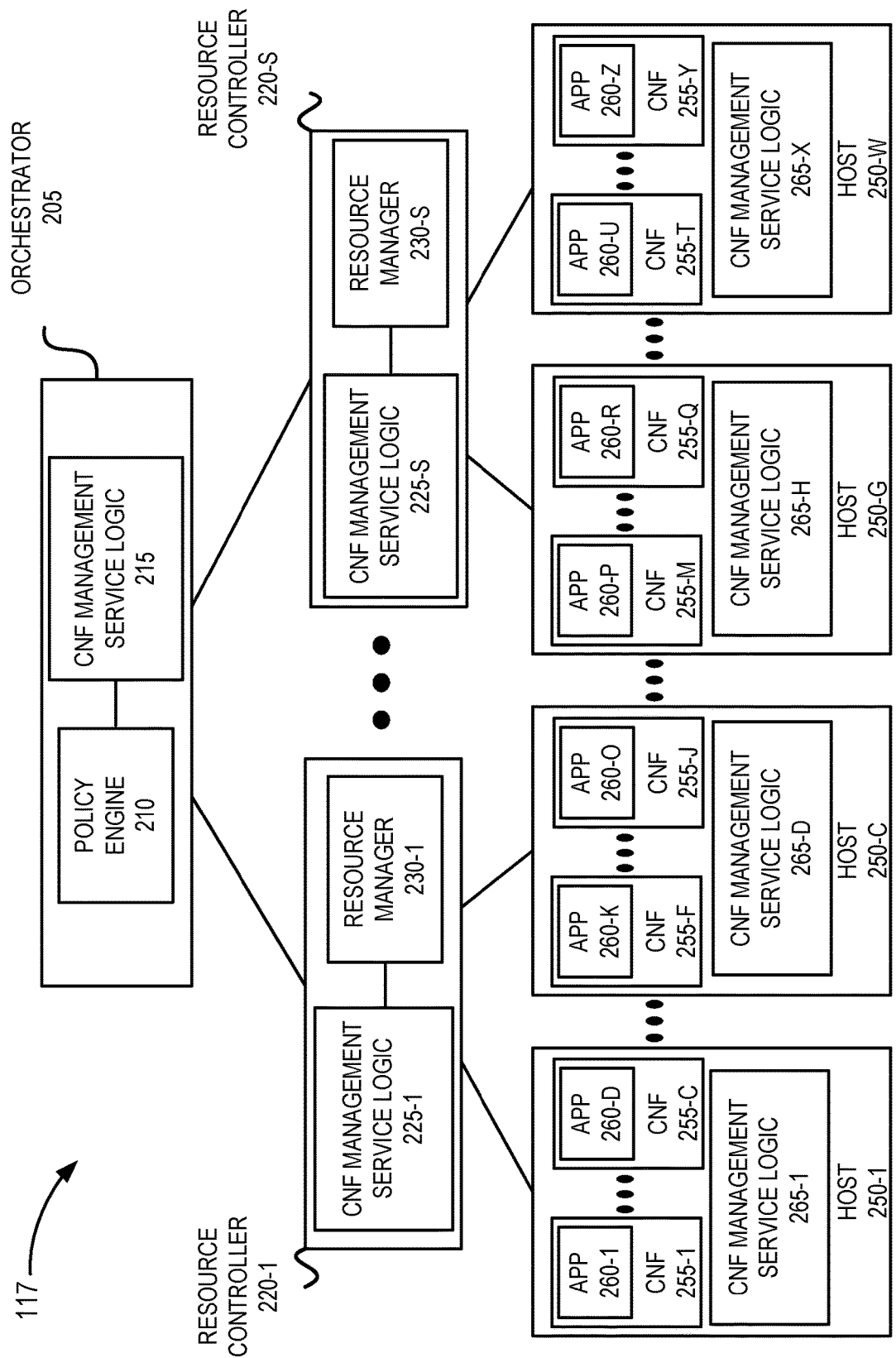
FIG. 2 is a diagram illustrating an exemplary embodiment of network devices that may provide an exemplary embodiment of the CNF management service.

FIG. 2 is a diagram illustrating exemplary network devices (e.g., external devices 117) of a network (e.g., external network 115) that may provide a portion or substantially an entirety of the CNF management service, as described herein. According to various exemplary embodiments, external devices 117 may pertain to one or multiple application layer networks, such as a MEC network, a cloud network, and so forth, as described herein. As illustrated, external devices 117 may include an orchestrator 205, resource controllers 220-1 through 220-S (also referred to as controllers 220, and individually or generally as controller 220), and hosts 250-1 through 250-W (also referred to as hosts 250, and individually or generally as host 250).

The number, the type, and the arrangement of external devices 117 are exemplary. The number and the arrangement of communication links illustrated are also exemplary. External network 115 may include additional and/or different external devices 117 in other exemplary embodiments. For example, external devices 117 may include additional and/or different system or management level external devices 117 that are not illustrated and described for the sake of brevity. By way of further example, external devices 117 may be implemented according to a cloud computing architecture, IaaS, PaaS, SaaS, or another type of known or future network technology. In this regard, according to other exemplary embodiments, a management, control, and/or support device, a node, middleware, a layer, a component, a function, and/or an element of the network, platform, infrastructure, or service may be implemented to provide the CNF management service, as described herein.

Additionally, according to still other exemplary embodiments, external devices 117 may include a machine learning device and/or an artificial intelligence (AI) device, which may contribute (wholly or in part) to the performance of an operation of the CNF management service, as described herein.

Orchestrator 205 may include logic that provides the CNF management service. According to an exemplary embodiment, orchestrator 205 may include a policy engine 210 and CNF management service logic 215. Orchestrator 205 may include logic that performs other types of operations, such as management of application service/microservice rules and requirements and/or other system level management functions pertaining to an application layer network. For example, orchestrator 205 may include logic that monitors, detects events, and reacts to changing conditions at orchestrator 205, at other external devices 117 (e.g., controller 220, host 250, etc.), and/or at network devices external from external network 115 (e.g., access devices 107, core devices 122, etc.). Orchestrator 205 may include Kubernetes (k8s), Amazon web services (AWS), Nomad, IronWorker, Docker Swarm, Amazon Elastic Container Service (ECS), Helios, Apache Mesos, Red Hat OpenShift Container Platform, Cloudify, and/or the like.

Policy engine 210 may store auto-scaling rules for application services. For example, the auto-scaling rules may relate to a category of an application service (e.g., mission critical, real-time, non-real-time, video streaming, IoT, etc.) and/or on a per-application service basis. An auto-scaling rule may include a minimum value and/or a maximum value relating to a triggering of an auto-scaling (e.g., HPA, etc.) procedure. The auto-scaling rules may include other types of information, such as a schedule for auto-scaling, a time period during which a minimum value and/or a maximum value is sustained, other types of triggering events (e.g., Hypertext Transfer Protocol (HTTP) triggers, non-HTTP triggers, etc.) and/or other types of configurable parameters (e.g., precedence between rules, resolving conflicts between rules, etc.) that may be used to govern auto-scaling.

As previously described, auto-scaling may include an HPA infrastructure for adjusting the number of instances (e.g., VMs, pods, containers, host devices, etc.) in response to the amount of usage of available resources (e.g., memory, disk space, processor, communication interface, port, etc.) relative to their capacities. HPA rules may be based on for example, properties and/or events. For example, the parameters configured to trigger the respective HPA rule may include minimum, maximum, and/or range values relating to hardware utilization, such as processor utilization (e.g., physical, virtual, logical), memory utilization (e.g., physical, virtual, logical), and/or another type of hardware resource; number of application session requests over a time period; number of bytes received over a time period; number of bytes transmitted over a time period; an application-specific KPI threshold, a performance metric threshold, queue length and/or depth, number of pending application service requests; and/or other types of monitored parameters, properties and/or events relating to the provisioning of an application service and/or a state of the system.

CNF management service logic 215 may include logic that provides an exemplary embodiment of the CNF management service, as described herein. For example, CNF management service logic 215 may obtain and analyze CNF management service information. For example, the CNF management service information may include resource utilization information, KPI information, performance metric information, and other types of metrics and/or criteria, as described herein, which may be used to provision and manage application services.

CNF management service logic 215 may include logic to manage other external devices 117 based on results of its analysis. For example, CNF management service logic 215 may determine whether to invoke HPA, determine whether the HPA has improved a particular state associated with a virtual network device 255, a host 250, and/or an application 260, determine whether to perform another iteration of HPA, determine whether to invoke another type of application management (e.g., latency-aware load balancing, throttling of (application) requests, etc.), and/or determine whether to invoke CNF management service logic 265 at host device 250. CNF management service logic 215 may manage other external devices 117 based on policy engine 210.

Resource controller 220 may include logic that manages hosts 250. According to an exemplary embodiment, resource controller 220 may be included in a VIM, a VNFM, an ME platform manager, or an edge controller. As illustrated, resource controllers 220 may include CNF management service logic 225-1 through 225-S (also referred to as CNF management service logic instances 225, and generally or individually as CNF management service logic 225), and resource managers 230-1 through 230-S (also referred to as resource managers 230, and individually or generally as resource manager 230).

CNF management service logic 225 may include logic that provides an exemplary embodiment of the CNF management service, as described herein. For example, CNF management service logic 225 may communicate, via an API, with CNF management service logic 215 and CNF management service logic 265 to enable the performance of operations associated with the CNF management service. In one embodiment, CNF management service logic 215 may also manage HPA procedures via resource manager 230 based on communication with CNF management service logic 215 using an API, including a RestAPI and/or a GUI associated with an administrator dashboard, for example.

CNF management service logic 225 may also monitor, obtain, and/or provide CNF management service information to CNF management service logic 215. For example, the information may include network information and end device information. Network information may include information relating to resource utilization for physical, virtual, and/or logical resources at controller 220, host 250, and/or communication links. Network information may also include information relating to network performance, such as response rates for user requests, latency, packet drop rate, throughput, jitter, and/or other types of KPIs, QoS, service level agreement (SLA) parameters, and so forth. The network information may further include other types of information relating to health, security, usage of application service (e.g., the degree at which some features of an application service are used relative to other features, etc.), fault detection, and/or resource utilization and performance information relating to other networks and network devices (e.g., access network 105, access devices 107, core network 120, core devices 122), and communication links external from external network 115) that may pertain to the provisioning and management of an application service. The collected information may further include end device information. For example, the end device information may include information relating to end device performance, such as latency, packet drop rate, etc., and/or other types of KPIs, QoS, SLA parameters, and so forth pertaining to an application service and associated application service session, host device 250, and containerized NF (CNF) 255. According to other exemplary implementations, CNF management service logic 215 and/or CNF management service logic 265 may monitor, obtain, and/or provide the network information and/or the end device information, as described herein.

Resource manager 230 may include logic that manages the amount of physical, virtual, and/or logical resources provisioned for an application service. Resource manager 230 may modify the number of resources allocated based on communication with CNF management service logic 215, as described herein. For example, based on an HPA rule, resource manager 230 may allocate pods to an application service and associated host(s) 250 as defined the HPA rule.

Hosts 250 may include network devices that support the virtualization of hosted application services. Host 250 provides various physical resources (e.g., processors, memory, storage, communication interface, and/or other types of hardware resources). The hardware resources may be shared, dedicated, virtualized, logical, and/or another type of configuration. The physical resources may also include software (e.g., a micro-application, a composite application, a program, or another type of application, an operating system, etc.) and other elements, such as binaries, libraries, or another type of element, layer, or function (e.g., hypervisor, container engine, etc.) that may support the operation of a virtual entity.

According to an exemplary embodiment, as illustrated, hosts 250 may include CNFs 255-1 through 255-Y (also referred to as CNFs 255, and individually or generally as CNF 255), and CNF management service logic 265-1 through 265-X (also referred to as CNF management service logic instances 260, and individually or generally as CNF management service logic 265).

CNFs 255 may be implemented as containers, hypervisor-based (e.g., bare-metal hypervisor, hosted hypervisor) (also known as a VM), or other known (e.g., proprietary, hybrid, etc.) network function virtualization (NFV), or future generation virtualization. CNFs 255 may include hosted application services (Apps) 260-1 through 260-Z (also referred to as applications 260, and individually or generally as application 260). Application 260 may include software, firmware, and/or another form of executable code for an application service. Applications 260 may include one or multiple instances of the same or different application services. An application service may include a monolithic application, a microservice, a composite application (e.g., including multiple microservices), a distributed application, or another type of configurable architecture of the application service. Host 250 may support one or multiple CNFs 255 and applications 260 that provide application services.

CNF management service logic 265 may include logic that provides an exemplary embodiment of the CNF management service, as described herein. CNF management service logic 265 may be implemented as a virtualized network device, a container, a VM, a host services orchestrator, and/or a management/control layer, for example, on host 250.

Figure 3:
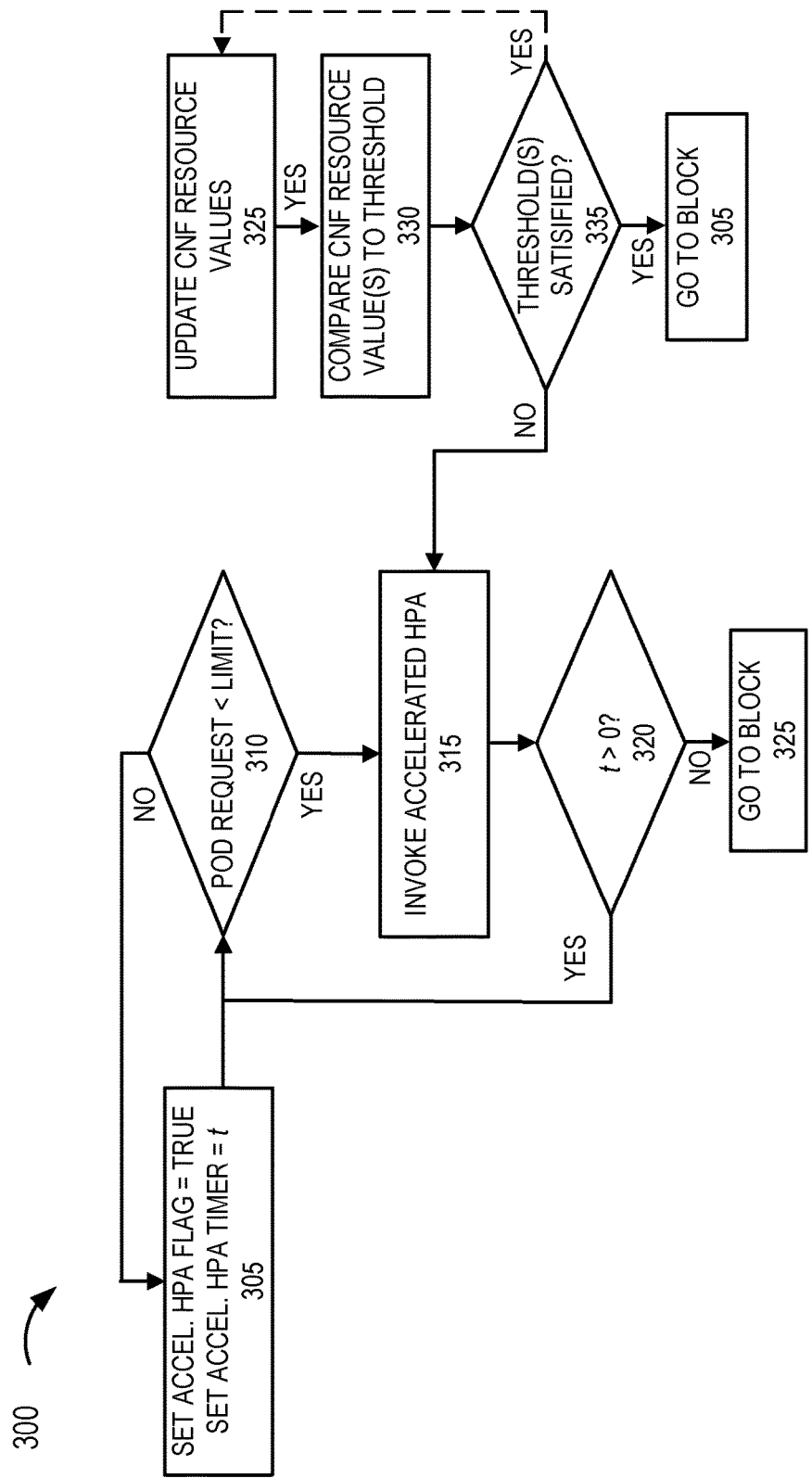
FIG. 3 is a diagram illustrating an exemplary process of an exemplary embodiment of the CNF management service.

FIG. 3 is a diagram illustrating an exemplary process 300 of an exemplary embodiment of the CNF management service. For example, process 300 may pertain to managing CNF resources for an application instance, associated with thresholds for a specific KPI, e.g., queue depth or the number of outstanding requests (e.g., HTTPS requests or another type of request). According to an exemplary embodiment, CNF management service logic may perform a step of process 300. For example, CNF management service logic 215 of orchestrator 205 and CNF management service logic 265 of host 250 may perform at least some of the steps of process 300. According to other examples, another control/management/support node, layer, component, etc., as described herein, may perform one or more of the steps of process 300.

As illustrated in FIG. 3, at block 305, an accelerated HPA flag may be set to "true" for an identified application service, and an accelerated HPA timer set to a time t, during which the flag is to remain true. For example, CNF management service logic 215 of orchestrator 205 may invoke an API based on various types of information, such as CNF management service information for the application service and/or associated resources. Orchestrator 205 may identify one or multiple resources of relevance to CNF 255 to analyze and determine a state or a triggering event, such as a planned/unplanned spike in usage of one or multiple application services and/or network demand, including failures of an active site and traffic roll-over to a backup site. In one embodiment, the state or event trigger may relate to customer demand (e.g., increase or decrease) or a denial-of-service attack (e.g., increase of requests, etc.).

At block 310, a determination may be made whether resources (e.g., worker nodes) are deployed and/or reserved for providing the application service to end devices 130. For example, CNF management service logic 215 of orchestrator 205 may compare a pod request value included in or calculated from the CNF management service information to a corresponding pod limit value. By way of further example, the pod limit value may be configured specific to the application service (e.g., app 260).

Based upon a determination that the pod request value is greater than the pod limit (block 310—NO), process 300 may return to block 305, and in the process CNF management service logic 215 of orchestrator 205 may reset the flag and/or the timer, for example, based on updated CNF management service information, such as resource deployment and/or reservation.

Alternatively, based upon a determination that the pod request value is less than the pod limit value (block 310—YES), accelerated HPA invocation may be enabled (block 315). For example, CNF management service logic 215 may connect the API to the accelerated HPA infrastructure (e.g., k8s), for example, as an external metrics API, based on one or more parameters defined by policy engine 210. The API may also connect to a cluster auto scaler to allocate additional worker nodes substantially instantaneously (e.g., non-incrementally).

The container orchestration platform may be invoked irrespective of particular types of CNF service management information, such as a degree to which the resource demand and/or a KPI is currently satisfied, the type or the particular application service, and/or other configurable parameters included in the autoscaling rules applicable to the application service (e.g., app 260), virtual network device 255, and/or host 250. According to various exemplary scenarios, the HPA invocation may involve adding and/or activating pods (e.g., logical units of VMs, containers, host devices, etc.) to an executing application service instance, for example.

At block 320, a determination may be made whether the accelerated HPA timer has expired or not. When t>0, process 300 may return to block 310, and a re-determination made whether the pod request value is less than the pod limit value. Alternatively, when t=0, and in turn the accelerated HPA flag set to "false," process 300 may proceed to block 325.

At block 325, application service-specific CNF resource value information may be updated. For example, CNF management service logic 215 of orchestrator 205 may obtain one or more KPI values and/or ranges of values, one or multiple performance metrics, and/or a service level agreement parameter. According to other examples, a different KPI may be identified, such as packet drop, latency, peak data rate, reliability, application service availability, or another type of configured KPI. According to even other examples, the KPI may relate to transactions per second (TPS) and/or connections per second (CPS) in which a threshold may help determine how busy the application is or a latency threshold in responses or requests may help show that a choke point has developed. According to other examples, process 300 may include identifying a resource instead of or in addition to a KPI. For example, a threshold (e.g., utilization, availability, etc.) for a compute resource such as CPU, memory, or storage may help identify and avoid current or prospective application instability. According to yet another example, a packet drop threshold may be used to determine whether the application or its environment is unhealthy. Additionally, a delta pertaining to a historical trend (e.g., KPI or resource-related) may also be used as a basis for monitoring and subsequent action if determined.

At block 330, one or multiple CNF resource values may be compared to corresponding CNF resource value thresholds. For example, CNF management service logic 215 of orchestrator 205 may compare a CNF resource value (e.g., a KPI value) included in or calculated from the updated CNF management service information to corresponding CNF value thresholds.

Based upon a determination that the resource value threshold is satisfied (block 335—YES), process 300 may return to block 305. Alternatively, or in parallel, process 300 may return to block 325. Based upon a determination that the resource value threshold is not satisfied (block 335—NO), accelerated HPA may be enabled (block 315). For example, the CNF management service may perform another iteration of accelerated HPA to instantaneously add pods to provide the application service. Additionally, block 320 may be subsequently performed.

Figure 4:
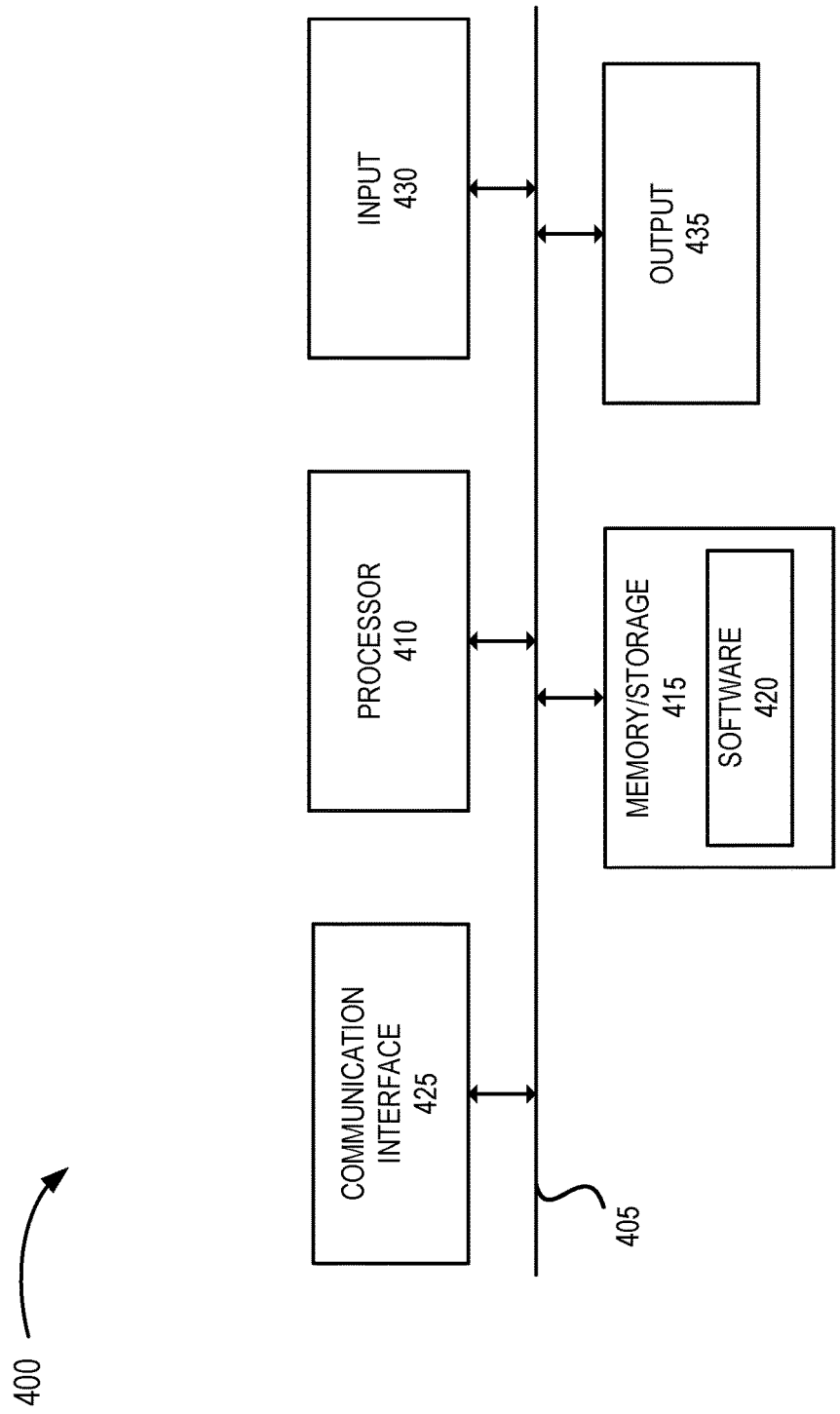
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access device 107, external device 117, core device 122, end device 130, orchestrator 205, controller 220, host 250, and/or other types of devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2 D, 3 D, NOR, NAND, etc.), a solid state memory, and/or some other type of memory. Memory/storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to orchestrator 205, software 420 may include an application that, when executed by processor 410, provides a function and/or a process of CNF management service, as described herein. Additionally, with reference to host device 250, software 420 may include an application that, when executed by processor 410, provides a function and/or a process of CNF management service, as described herein. Also, with reference to controller 220 or other devices, software 420 may include an application that, when executed by processor 410, provides a function and/or a process of CNF management service, as described herein. Software 420 may also include firmware, middleware, microcode, hardware description language (HDL), and/or other form of instruction. Software 420 may also be virtualized.

Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
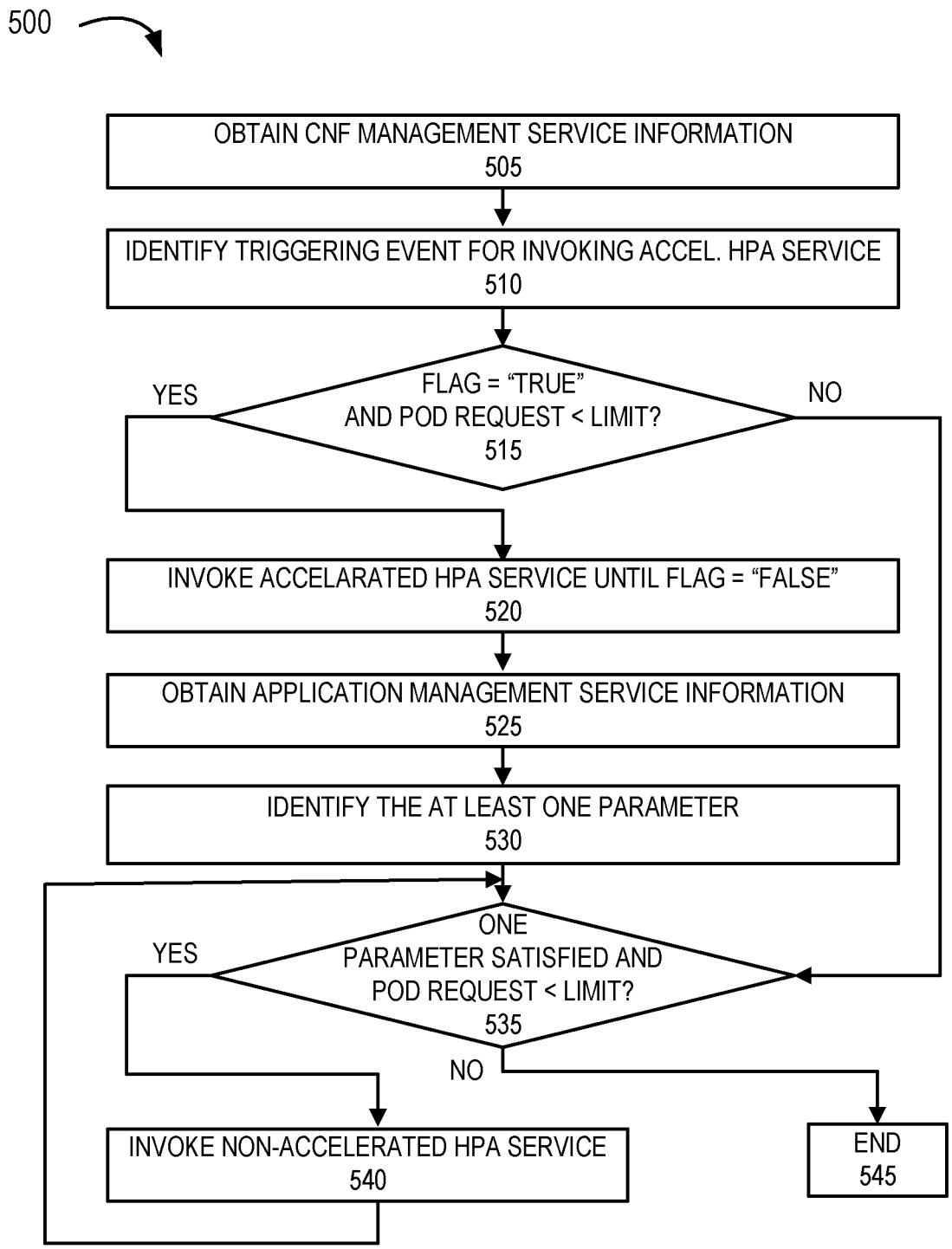
FIG. 5 is a diagram illustrating another exemplary process of an exemplary embodiment of the CNF management service.

FIG. 5 is a flow diagram illustrating an exemplary process 500 of an exemplary embodiment of CNF management service. According to an exemplary embodiment, external device 117 may perform a step of process 500. According to an exemplary implementation, processor 410 executes software 420 to perform the step of process 500, as described herein. Alternatively, the step may be performed by execution of only hardware. Process 500 may be directed to an application service 260, a CNF (e.g., CNF 255), a host device (e.g., 250), a cluster of host devices, another logical or virtual division or portion of external network 115, or at a network level scale.

At block 505, external device 117 may obtain CNF management service information, as described herein. At block 510, external device 117 may identify at least one application service-specific triggering event for invoking the accelerated HPA service. For example, the at least one triggering event may pertain to a threshold (e.g., utilization, available, etc.) for a compute resource such as CPU, memory, or storage may help identify and avoid current or prospective application instability. According to yet another example, a packet drop threshold may be used to determine whether the application and its environment are unhealthy. Additionally, a delta pertaining to a historical trend (e.g., KPI or resource-related) may also be used as a basis for triggering the accelerated HPA service.

At block 515, external device 117 may determine whether a data instance is selected to indicate (e.g., an accelerated HPA flag is set to "true") that an identified application service is configured for accelerated HPA (i.e., selection of non-incremental HPA over incremental HPA). For example, external device 117 may compare values data obtained using an API indicating whether a policy rule for accelerated HPA is indicated for the application service and/or whether a pod request associated with the API indicates a pod request value that is less than a pod limit. When one or both of the conditions are unsatisfied (block 515—NO), process 500 may proceed to block 535. When it is determined that both conditions are satisfied (block 515—YES), external device 117 may invoke the accelerated HPA service (block 520). For example, external device 117 may execute HPA as described herein to continuously add resources (e.g., pods) until either a timer associated with the flag expires and/or the maximum number of resources have been allocated to the application service.

At block 525, external device 117 may obtain CNF management service information, as described herein. At block 530, external device 117 may identify the at least one parameter of relevance. For example, the at least one parameter may relate to one or multiple parameters associated with a resource, a KPI, a performance metric, an SLA, and/or another configurable parameter of relevance to management of an application service.

At block 535, external device 117 may determine whether the at least one parameter is satisfied. For example, external device 117 may compare a value associated with the at least one parameter to at least one threshold. When it is determined that the at least one parameter is not satisfied (block 535—NO), process 500 may proceed to block 545. When it is determined that the at least one parameter is satisfied (block 535—YES), external device 117 may invoke and execute a non-accelerated HPA service (block 540). For example, external device may pause for configured amounts of time before iteratively performing block 535 and allocating additional resources (e.g., pods) to provide application services to end devices 130. The application management function may be performed by a host device or a CNF, for example, as described herein.

FIG. 5 illustrates an exemplary embodiment of a process of CNF management service, according to other exemplary embodiments, the CNF management service may perform additional operations, fewer operations, and/or different operations than those illustrated and described. For example, after block 540, process 500 may include further determinations regarding whether the at least one parameter is satisfied or not. Additionally, process 500 may include, when the at least one parameter is satisfied to disable a platform/network service and/or an application management function, as described herein. According to other exemplary embodiments of the CNF management service, as described herein, the order of executing and/or invoking platform/network level application management functions and application level application management functions may be different. For example, a circuit breaker function and/or a throttling function may be invoked or executed before an autoscaling function. Additionally, or alternatively, platform/network level and application level functions may be invoked or executed in a parallel or serial manner.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   allocating, by a network device of an application service layer network, discrete sets of containerized network function (CNF) resources deployed as a plurality of pods to provide application services to end devices;
   identifying, by the network device, threshold resource values associated with a first number of the deployed pods which are activated to provide the application services;
   determining, by the network device, a first state of anticipated nonsatisfaction of multiple ones of the threshold resource values;
   invoking, by the network device responsive to the first state and for a configurable period of time, non-incremental horizontal pod autoscaling (HPA) via an application programming interface (API) to activate a second number of the deployed pods to provide the application services;
   determining, by the network device, a second state of anticipated satisfaction of at least one of the multiple threshold resource values; and
   invoking, by the network device responsive to the second state, incremental HPA via the API to activate a third number of the deployed pods until each of the plurality of deployed pods has been activated, to provide the application services.

2. The method of claim 1, wherein the anticipated nonsatisfaction corresponds to an unplanned spike in a demand for the application services, and
   wherein the API comprises a Representational State Transfer (REST) API.

3. The method of claim 1, wherein the anticipated nonsatisfaction corresponds to a planned spike in a demand for the application services, and
   wherein the API comprises a graphical user interface.

4. The method of claim 1, wherein the at least one threshold resource value relates to at least one of a key performance indicator (KPI), a processing capacity usage, or a memory capacity usage associated with the first number of deployed pods.

5. The method of claim 1, wherein the network device comprises a container orchestration platform.

6. The method of claim 1, wherein the non-incremental HPA is invoked for a duration of the configurable period of time.

7. The method of claim 1, wherein the first number, the second number, and the third number of the deployed pods constitute an entirety of the plurality of deployed pods.

8. A network device of an application service layer network, comprising:
a processor configured to:
allocate discrete sets of containerized network function (CNF) resources deployed as a plurality of pods to provide application services to end devices;
identify threshold resource values associated with a first number of the deployed pods which are activated to provide the application services;
determine a first state of anticipated nonsatisfaction of multiple ones of the threshold resource values;
invoke, responsive to the first state and for a configurable period of time, non-incremental horizontal pod autoscaling (HPA) via an application programming interface (API) to activate a second number of the deployed pods to provide the application services;
determine a second state of anticipated satisfaction of at least one of the multiple threshold resource values; and
invoke, responsive to the second state, incremental HPA via the API to activate a third number of the deployed pods until each of the plurality of deployed pods has been activated, to provide the application services.

9. The network device of claim 8, wherein the anticipated nonsatisfaction corresponds to an unplanned spike in a demand for the application services, and
wherein the API comprises a Representational State Transfer (REST) API.

10. The network device of claim 8, wherein the anticipated nonsatisfaction corresponds to a planned spike in a demand for the application services, and
wherein the API comprises a graphical user interface.

11. The network device of claim 8, wherein the at least one threshold resource value relates to at least one of a key performance indicator (KPI), processing capacity usage, or memory capacity usage associated with the first number of deployed pods.

12. The network device of claim 8, wherein the network device comprises a container orchestration platform.

13. The network device of claim 8, wherein the non-incremental HPA is invoked for a duration of the configurable period of time.

14. The network device of claim 8, wherein the first number, the second number, and the third number of the deployed pods constitute an entirety of the plurality of deployed pods.

15. A non-transitory computer-readable storage medium storing instructions executable by a processor of a network device of an application service layer network, wherein the instructions are configured to:
allocate discrete sets of containerized network function (CNF) resources deployed as a plurality of pods to provide application services to end devices;
identify threshold resource values associated with a first number of the deployed pods which are activated to provide the application services;
determine a first state of anticipated nonsatisfaction of multiple ones of the threshold resource values;
invoke, responsive to the first state and for a configurable period of time, non-incremental horizontal pod autoscaling (HPA) via an application programming interface (API) to activate a second number of the deployed pods to provide the application services;
determine a second state of anticipated satisfaction of at least one of the multiple threshold resource values; and
invoke, responsive to the second state, incremental HPA via the API to activate a third number of the deployed pods until each of the plurality of deployed pods has been activated, to provide the application services.

16. The non-transitory computer-readable storage medium of claim 15, wherein the anticipated nonsatisfaction corresponds to an unplanned spike in a demand for the application services, and
wherein the API comprises a Representational State Transfer (REST) API.

17. The non-transitory computer-readable storage medium of claim 15, wherein the anticipated nonsatisfaction corresponds to a planned spike in a demand for the application services, and
wherein the API comprises a graphical user interface.

18. The non-transitory computer-readable storage medium of claim 15, wherein the at least one threshold resource value relates to at least one of a key performance indicator (KPI), processing capacity usage, or memory capacity usage associated with the first number of deployed pods.

19. The non-transitory computer-readable storage medium of claim 15, wherein the non-incremental HPA is invoked for a duration of the configurable period of time.

20. The non-transitory computer-readable storage medium of claim 15, wherein the first number, the second number, and the third number of the deployed pods constitute an entirety of the plurality of deployed pods.

\* \* \* \* \*